United States Patent
Luo et al.

(10) Patent No.: US 12,149,468 B2
(45) Date of Patent: Nov. 19, 2024

(54) METHOD PERFORMED BY USER EQUIPMENT, AND USER EQUIPMENT

(71) Applicant: SHARP KABUSHIKI KAISHA, Osaka (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 360 days.

(21) Appl. No.: 17/620,955

(22) PCT Filed: Jun. 24, 2020

(86) PCT No.: PCT/CN2020/098055
§ 371 (c)(1),
(2) Date: Dec. 20, 2021

(87) PCT Pub. No.: WO2020/259568
PCT Pub. Date: Dec. 30, 2020

(65) Prior Publication Data
US 2022/0360389 A1 Nov. 10, 2022

(30) Foreign Application Priority Data
Jun. 25, 2019 (CN) .......................... 201910558332.4

(51) Int. Cl.
*H04L 5/00* (2006.01)
*H04W 56/00* (2009.01)

(52) U.S. Cl.
CPC ......... *H04L 5/0048* (2013.01); *H04W 56/001* (2013.01)

(58) Field of Classification Search
CPC ... H04L 5/0007; H04L 5/0048; H04L 5/0053; H04W 4/40; H04W 56/001; H04W 72/04; H04W 72/0446; H04W 72/23
See application file for complete search history.

(56) References Cited

U.S. PATENT DOCUMENTS

| 10,470,143 B2 * | 11/2019 | Corley | ................. H04W 56/001 |
| 11,330,549 B2 * | 5/2022 | Zhang | .................. H04W 64/00 |

(Continued)

FOREIGN PATENT DOCUMENTS

| CN | 107682925 A | | 2/2018 | |
| CN | 111148229 A | * | 5/2020 | ........... H04L 5/0053 |

(Continued)

OTHER PUBLICATIONS

LG Electronics et al., "New WID on 5G V2X with NR sidelink", RP-190766, 3GPP TSG RAN Meeting #83, Shenzhen, China, Mar. 18-21, 2019.

(Continued)

*Primary Examiner* — Eric Nowlin
(74) *Attorney, Agent, or Firm* — ScienBiziP, P.C.

(57) ABSTRACT

A method performed by user equipment, including: step A of acquiring time-domain configuration information and/or time-domain indication information; and step B of determining timing-related information according to the time-domain configuration information and/or the time-domain indication information and/or other information.

1 Claim, 3 Drawing Sheets

(56) References Cited

U.S. PATENT DOCUMENTS

| | | | |
|---|---|---|---|
| 11,576,133 B2* | 2/2023 | Lindholm | H04W 56/001 |
| 11,632,727 B2* | 4/2023 | Ryu | H04L 5/0091 370/329 |
| 11,641,629 B2* | 5/2023 | Wu | H04W 56/001 370/350 |
| 11,937,194 B2* | 3/2024 | Park | H04J 11/0069 |
| 2014/0161000 A1* | 6/2014 | Fazlollahi | H04M 11/062 370/280 |
| 2019/0289561 A1* | 9/2019 | Corley | H04W 24/02 |
| 2020/0229114 A1* | 7/2020 | Ryu | H04L 27/26025 |
| 2021/0160810 A1* | 5/2021 | Zhang | G01S 5/10 |
| 2021/0168740 A1* | 6/2021 | Park | H04W 56/0015 |
| 2021/0168762 A1* | 6/2021 | Huang | H04L 1/1864 |
| 2021/0219248 A1* | 7/2021 | Wu | G04R 20/02 |
| 2021/0405146 A1* | 12/2021 | Avitzour | G01S 5/02 |
| 2022/0022170 A1* | 1/2022 | Liu | H04W 72/0446 |
| 2022/0086782 A1* | 3/2022 | Chen | H04L 5/001 |
| 2022/0360389 A1* | 11/2022 | Luo | H04L 5/0007 |
| 2023/0180342 A1* | 6/2023 | Shin | H04W 4/70 370/329 |
| 2023/0254789 A1* | 8/2023 | Ryu | H04L 27/26025 370/329 |
| 2024/0188009 A1* | 6/2024 | Park | G01S 19/05 |

FOREIGN PATENT DOCUMENTS

| | | | |
|---|---|---|---|
| CN | 111278126 A * | 6/2020 | H04W 56/001 |
| CN | 111684842 A * | 9/2020 | H04L 5/001 |
| CN | 111886908 A * | 11/2020 | H04B 1/70735 |
| CN | 112567831 A * | 3/2021 | G01S 19/05 |
| CN | 113287346 A * | 8/2021 | G01S 19/51 |
| CN | 110912846 B * | 10/2021 | H04L 27/0014 |
| CN | 111886908 B * | 3/2022 | H04B 1/70735 |
| CN | 114270939 A * | 4/2022 | |
| CN | 114982308 A * | 8/2022 | G04R 20/02 |
| CN | 111148229 B * | 1/2023 | H04L 5/0053 |
| CN | 111278126 B * | 1/2023 | H04W 56/001 |
| CN | 115699988 A * | 2/2023 | H04L 1/1854 |
| CN | 114270939 B * | 3/2023 | |
| CN | 116347587 A * | 6/2023 | |
| EP | 3840488 A1 * | 6/2021 | G01S 19/05 |
| EP | 3747221 B1 * | 1/2022 | H04B 1/70735 |
| EP | 3952532 A1 * | 2/2022 | H04W 56/001 |
| EP | 4142425 A1 * | 3/2023 | H04L 1/1854 |
| JP | 2022528248 A * | 6/2022 | |
| JP | 7247366 B2 * | 3/2023 | H04W 56/001 |
| KR | 20200020536 A * | 2/2020 | |
| KR | 20200087017 A * | 7/2020 | |
| KR | 20210146398 A * | 3/2021 | |
| KR | 20220011444 A * | 1/2022 | |
| KR | 102367084 B1 * | 2/2022 | |
| TW | 202034711 A * | 9/2020 | H04L 5/001 |
| TW | I747134 B * | 11/2021 | |
| WO | WO-2018143854 A1 * | 8/2018 | |
| WO | WO-2019027245 A1 * | 2/2019 | G01S 1/0428 |
| WO | WO-2019177848 A1 * | 9/2019 | H04B 1/70735 |
| WO | WO-2020036455 A1 * | 2/2020 | G01S 19/05 |
| WO | WO-2020057410 A1 * | 3/2020 | H04L 27/0014 |
| WO | WO-2020088653 A1 * | 5/2020 | H04L 5/0053 |
| WO | WO-2020142999 A1 * | 7/2020 | |
| WO | WO-2020143756 A1 * | 7/2020 | H04L 5/001 |
| WO | WO-2020145671 A1 * | 7/2020 | G01S 19/51 |
| WO | WO-2020200203 A1 * | 10/2020 | H04W 56/001 |
| WO | WO-2022019615 A1 * | 1/2022 | H04L 1/1854 |
| WO | WO-2022021439 A1 * | 2/2022 | |
| WO | WO-2023154409 A1 * | 8/2023 | |

OTHER PUBLICATIONS

Vodafone, "New SID: Study on NR V2X", RP-181429, 3GPP TSG RAN Meeting #80, La Jolla, USA, Jun. 11-14, 2018.
NTT Docomo, Inc., "Revised WID on New Radio Access Technology", RP-181474, 3GPP TSG RAN Meeting #80, La Jolla, USA, Jun. 11-14, 2018.
Ericsson, "Introducing the DFN Offset", R2-1700945, 3GPP TSG-RAN WG2 #97, Athens, Greece, Feb. 13-17, 2017.
Huawei et al. "Discussion on co-existence for NR-V2X and LTE-V2X", R1-1812215, 3GPP TSG RAN WG1 Meeting #95, Spokane, USA, Nov. 12-16, 2018.
Sharp, "Remaining issues on synchronization mechanism for NR sidelink", R1-2000879, 3GPP TSG RAN WG1 Meeting #100, Athens, Greece, Feb. 24-28, 2020.

* cited by examiner

METHOD PERFORMED BY USER EQUIPMENT, AND USER EQUIPMENT

TECHNICAL FIELD

The present invention relates to a method performed by user equipment, and user equipment.

BACKGROUND

Vehicle-to-Everything (V2X) communication refers to communication between a vehicle and any entity that may affect the vehicle. Typical V2X communication includes V2I (Vehicle-to-Infrastructure), V2N (Vehicle-to-Network), V2V (Vehicle-to-Vehicle), V2P (Vehicle-to-Pedestrian), etc. 3GPP's LTE standards support V2V communication (3GPP V2X phase 1) from Rel-14, and V2X communication (3GPP V2X phase 2) from Rel-15. In the 3GPP standard specifications, the V2V and V2X are both based on D2D (Device to Device) technology, and a corresponding interface between UE and UE is referred to as PC5, also referred to as a "direct" or "side" link (sidelink, or SL for short), to distinguish from uplink (UL for short) and downlink (DL for short).

As 5G NR (see Non-Patent Document 1, hereinafter referred to as 5G for short, or NR, or NR Rel-15, or 5G Rel-15) standardization work progresses, and the 3GPP identifies more advanced V2X service (eV2X service) demands, 3GPP V2X phase 3, i.e., 5G V2X, is on the agenda. In June 2018, a new study item (see Non-Patent Document 2, hereinafter referred as 5G V2X study item for short, or V2X Phase 3 study item) on 3GPP 5G V2X was approved at the 3GPP RAN #80 plenary session. In March 2019, a new work item on 3GPP 5G V2X (see Non-Patent Document 3, hereinafter referred as 5G V2X work item for short) was approved at the 3GPP RAN #83 plenary session. Goals of the 5G V2X work item include:
- design of SL signals, channels, bandwidth parts (BWP), and resource pools;
- design of resource allocation mechanisms;
- design of SL synchronization mechanisms;
- coexistence of SL operations for LTE and NR;
- SL physical layer procedures, e.g., a HARQ (hybrid automatic repeat request) procedure, CSI (channel-state information) acquisition and power control, etc.;
- congestion control;
- layer 2/layer 3 protocols and signaling;
- control of an LTE SL over an NR Uu interface;
- gNB scheduling based on UE reporting assistance information; and
- QoS management.

In 5G V2X, a physical layer of an SL interface supports broadcast, groupcast, and unicast transmissions in in-coverage, out-of-coverage, and partial-coverage scenarios.

5G V2X supports an SL synchronization function. Relevant signals and channels include:
- an SL PSS (sidelink primary synchronization signal), also known as S-PSS, or PSSS (primary sidelink synchronization signal);
- an SL SSS (sidelink secondary synchronization signal), also known as S-SSS or SSSS (secondary sidelink synchronization signal); and
- a PSBCH (physical sidelink broadcast channel).

In 5G V2X, a SL PSS, a SL SSS, and a PSBCH are organized into the form of a block in a time-frequency resource grid, called SL SSB (sidelink SS/PBCH block, sidelink synchronization signal/physical broadcast channel block), or S-SSBs. The transmission bandwidth of a SL SSB is within an SL BWP (sidelink bandwidth part) configured for UE. The SL PSS and/or the SL SSS may carry an SL SSID (sidelink synchronization identity, or sidelink synchronization identifier, or sidelink synchronization signal identity, or sidelink synchronization signal identifier), and the PSBCH may carry an SL MIB (sidelink master information block, also referred to as S-MIB or MIB-SL or MIB-SL-V2X).

A synchronization source (sometimes also referred to as a synchronization reference, or as a synchronization reference source) for 5G V2X may include a GNSS (global navigation satellite system), a gNB, an eNB, and NR UE. The priority definition of the synchronization sources is shown in Table 1. UE uses (pre)configuration information to determine whether to use "GNSS-based synchronization" or "gNB/eNB-based synchronization." Examples of the GNSS include the GPS (Global Positioning System), the GLONASS (Global Navigation Satellite System), the BeiDou (Beidou Navigation Satellite System), the Galileo (Galileo Navigation Satellite System), the QZSS (Quasi-Zenith Satellite System), etc.

TABLE 1

| | 5G V2X synchronization source priority | |
|---|---|---|
| Priority | GNSS-based synchronization | gNB/eNB-based synchronization |
| P0 | GNSS | gNB/eNB |
| P1 | All UE directly synchronized to GNSS | All UE directly synchronized to gNB/eNB |
| P2 | All UE indirectly synchronized to GNSS | All UE indirectly synchronized to gNB/eNB |
| P3 | Any other UE | GNSS |
| P4 | N/A | All UE directly synchronized to GNSS |
| P5 | N/A | All UE indirectly synchronized to GNSS |
| P6 | N/A | Any other UE |

In the out-of-coverage scenario, and in an RRC_IDLE state, one SL BWP may be (pre)configured on one 5G V2X carrier. In the in-coverage scenario, there is only one active SL BWP on one 5G V2X carrier. One or a plurality of resource pools (which refers to a time-frequency resource set that can be used for SL transmission and/or reception) may be (pre)configured on one SL BWP.

Resource allocation modes for 5G V2X may be categorized as follows:
- Mode 1: A base station schedules SL resources for SL transmission.
- Mode 2: UE determines the SL resources for SL transmission (i.e., the base station does not participate in scheduling of the SL resources).

Other channels involved in 5G V2X include at least:
- a PSSCH (physical sidelink shared channel);
- a PSCCH (physical sidelink control channel); and
- a PSFCH (physical sidelink feedback channel).

In 5G V2X, transmitter UE can schedule, through SCI (sidelink control information) carried by the PSCCH, transmission of data carried by the PSSCH (in the form of transport blocks (TBs)); receiver UE can indicate, through HARQ feedback information carried in the PSFCH, whether a transport block has been correctly received. Depending on factors such as whether unicast or groupcast or broadcast transmission is being scheduled, and whether HARQ feedback is required, the SCI may at least include one or more of the following:

a layer-1 source identifier (layer-1 source ID), or a physical layer source identifier (physical layer source ID);
a layer-1 destination identifier (layer-1 destination ID), or a physical layer destination identifier (physical layer source ID);
a HARQ process identifier (HARQ process ID), or a HARQ process number;
a new data indicator (NDI); and
a redundancy version (RV).

In 5G V2X, a method for multiplexing a PSCCH and a PSSCH associated therewith at least includes: a part of the PSCCH and a part of the PSSCH associated therewith use resources overlapping in the time domain but not overlapping in the frequency domain, and another part of the PSCCH and/or another part of the PSSCH use resources not overlapping in the time domain.

In 5G V2X, potential issues of the SL design include at least:
in the case where a GNSS is used as a synchronization reference source, how to calculate or derive complete timing information of a sidelink such as a direct frame number (DFN), a direct subframe number, and a direct slot number.

PRIOR ART DOCUMENTS

Non-Patent Documents

Non-Patent Document 1: RP-181474, Revised WID on New Radio Access Technology
Non-Patent Document 2: RP-181429, New SID: Study on 5G V2X
Non-Patent Document 3: RP-190766, New WID on 5G V2X with NR sidelink

SUMMARY

In order to address at least part of the aforementioned issues, the present invention provides a method performed by user equipment, and user equipment.

According to the present invention, proposed is a method performed by user equipment, including: step A of acquiring time-domain configuration information and/or time-domain indication information; and step B of determining timing-related information according to the time-domain configuration information and/or the time-domain indication information and/or other information.

The time-domain configuration information and the time-domain indication information may include one or more of a time zero, a reference time, a target time, and a timing offset.

Herein, the time zero, the reference time, the target time, and the timing offset may each correspond to one parameter.

Herein, the parameter(s) may be configured in a semi-static manner or a dynamic manner.

Additionally, the timing-related information may be timing information of a sidelink (SL).

The timing information of the sidelink may include one or more of a hyper direct frame number, a direct frame number, a direct half-frame number, a direct subframe number, and a direct slot number.

Herein, the direct slot number may be the number of a direct slot in a hyper direct frame, or the number thereof in a direct frame, or the number thereof in a direct half-frame, or the number thereof in a direct subframe.

Furthermore, the direct slot number can be calculated using any one of the following formulas (1) to (20):

$$n_{directslot} = \lfloor (T_{target} - T_{ref} - \Delta_T)/T_{directslot}^{\mu} \rfloor \mod (N_{directslot}^{directframe,\mu} \cdot N_{directframe}^{hyperdirectframe,\mu} \cdot N_{hyperdirectframe}^{\mu}) \quad (1)$$

$$n_{directslot} = \lfloor T_{target} - T_{ref} - \Delta_T)/T_{directslot}^{\mu} \rfloor \mod (N_{directslot}^{directsubframe,\mu} \cdot N_{directsubframe}^{directframe,\mu} \cdot N_{directframe}^{hyperdirectframe,\mu} \cdot N_{hyperdirectframe}^{\mu}) \quad (2)$$

$$n_{directslot} = \lfloor (T_{target} - T_{ref} - \Delta_T)/T_{directslot}^{\mu} \rfloor \mod (N_{directslot}^{directhalfframe,\mu} \cdot N_{directhalfframe}^{directframe,\mu} \cdot N_{directframe}^{hyperdirectframe,\mu} \cdot N_{hyperdirectframe}^{\mu}) \quad (3)$$

$$n_{directslot} = \lfloor T_{target} - T_{ref} - \Delta_T)/T_{directslot}^{\mu} \rfloor \mod N_{directslot}^{directsubframe,\mu} \cdot N_{directsubframe}^{directhalfframe,\mu} \cdot N_{directhalfframe}^{directframe,\mu} \cdot N_{directframe}^{hyperdirectframe,\mu} \cdot N_{hyperdirectframe}^{\mu}) \quad (4)$$

$$n_{directslot} = \lfloor (T_{target} - T_{ref} - \Delta_T)/T_{directslot}^{\mu} \rfloor \mod (N_{directslot}^{directframe,\mu} \cdot N_{directframe}^{hyperdirectframe,\mu}) \quad (5)$$

$$n_{directslot} = \lfloor (T_{target} - T_{ref} - \Delta_T)/T_{directslot}^{\mu} \rfloor \mod (N_{directslot}^{directsubframe,\mu} \cdot N_{directsubframe}^{directframe,\mu} \cdot N_{directframe}^{hyperdirectframe,\mu}) \quad (6)$$

$$n_{directslot} = \lfloor (T_{target} - T_{ref} - \Delta_T)/T_{directslot}^{\mu} \rfloor \mod (N_{directslot}^{directhalfframe,\mu} \cdot N_{directhalfframe}^{directframe,\mu} \cdot N_{directframe}^{hyperdirectframe,\mu}) \quad (7)$$

$$n_{directslot} = \lfloor (T_{target} - T_{ref} - \Delta_T)/T_{directslot}^{\mu} \rfloor \mod (N_{directslot}^{directsubframe,\mu} \cdot N_{directsubframe}^{directhalfframe,\mu} \cdot N_{directhalfframe}^{directframe,\mu} \cdot N_{directframe}^{hyperdirectframe,\mu}) \quad (8)$$

$$n_{directslot} = \lfloor (T_{target} - T_{ref} - \Delta_T)/T_{directslot}^{\mu} \rfloor \mod (N_{directslot}^{directframe,\mu} \cdot N_{directframe}^{\mu}) \quad (9)$$

$$n_{directslot} = \lfloor (T_{target} - T_{ref} - \Delta_T)/T_{directslot}^{\mu} \rfloor \mod (N_{directslot}^{directsubframe,\mu} \cdot N_{directsubframe}^{directframe,\mu} \cdot N_{directframe}^{\mu}) \quad (10)$$

$$n_{directslot} = \lfloor (T_{target} - T_{ref} - \Delta_T) T_{directslot}^{\mu} \rfloor \mod (N_{directslot}^{directhalfframe,\mu} \cdot N_{directhalfframe}^{directframe,\mu} \cdot N_{directframe}^{\mu}) \quad (11)$$

$$n_{directslot} = \lfloor (T_{target} - T_{ref} - \Delta_T)/T_{directslot}^{\mu} \rfloor \mod N_{directslot}^{directsubframe,\mu} \cdot N_{directsubframe}^{directhalfframe,\mu} \cdot N_{directhalfframe}^{directframe,\mu} \cdot N_{directframe}^{\mu}) \quad (12)$$

$$n_{directslot} = \lfloor (T_{target} - T_{ref} - \Delta_T)/T_{directslot}^{\mu} \rfloor \mod N_{directslot}^{directframe,\mu} \quad (13)$$

$$n_{directslot} = \lfloor (T_{target} - T_{ref} - \Delta_T)/T_{directslot}^{\mu} \rfloor \mod (N_{directslot}^{directsubframe,\mu} \cdot N_{directsubframe}^{directframe,\mu}) \quad (14)$$

$$n_{directslot} = \lfloor (T_{target} - T_{ref} - \Delta_T)/T_{directslot}^{\mu} \rfloor \mod (N_{directslot}^{directhalfframe,\mu} \cdot N_{directhalfframe}^{directframe,\mu}) \quad (15)$$

$$n_{directslot} = \lfloor (T_{target} - T_{ref} - \Delta_T)/T_{directslot}^{\mu} \rfloor \mod N_{directslot}^{directsubframe,\mu} \cdot N_{directsubframe}^{directhalfframe,\mu} \cdot N_{directhalfframe}^{directframe,\mu}) \quad (16)$$

$$n_{directslot} = \lfloor (T_{target} - T_{ref} - \Delta_T)/T_{directslot}^{\mu} \rfloor \mod N_{directslot}^{directhalfframe,\mu} \quad (17)$$

$$n_{directslot} = \lfloor (T_{target} - T_{ref} - \Delta_T)/T_{directslot}^{\mu} \rfloor \mod (N_{directslot}^{directsubframe,\mu} \cdot N_{directsubframe}^{directhalfframe,\mu}) \quad (18)$$

$$n_{directslot} = \lfloor (T_{target} - T_{ref} - \Delta_T)/T_{directslot}^{\mu} \rfloor \mod (N_{directslot}^{directsubframe,\mu}) \quad (19)$$

$$n_{directslot} = \lfloor ((T_{target} - T_{ref} - \Delta_T) - \lfloor T_{target} - T_{ref} - \Delta_T \rfloor)/T_{directslot}^{\mu} \rfloor \quad (20)$$

where $n_{directslot}$ is the direct slot number;
$T_{directslot}^{\mu}$ is the length of each direct slot;
$T_{target}$ is the target time;
$T_{ref}$ is the reference time;
$\Delta T$ is the timing offset;

μ is a subcarrier spacing configuration corresponding to the sidelink;

$N_{directslot}^{directframe,\mu}$ is the number of direct slots included in each direct frame;

$N_{directframe}^{hyperdirectframe,\mu}$ is the number of direct frames included in each hyper direct frame;

$N_{directslot}^{directsubframe,\mu}$ is the number of direct slots included in each direct subframe;

$N_{directsubframe}^{directframe,\mu}$ is the number of direct subframes included in each direct frame;

$N_{directhalfframe}^{directframe,\mu}$ is the number of direct half-frames included in each direct frame;

$N_{directslot}^{directhalfframe,\mu}$ is the number of direct slots included in each direct half-frame;

$N_{directsubframe}^{directhalfframe,\mu}$ is the number of direct subframes included in each direct half-frame;

$N_{directslot}^{directsubframe,\mu}$ is the number of direct slots included in each direct subframe;

$N_{hyperdirectframe}^{\mu}$ is the number of hyper direct frames included in each hyper direct frame numbering period; and $N_{directframe}^{\mu}$ is the number of direct frames included in each direct frame numbering period.

Furthermore, the direct slot number may be the number of the direct slot in the hyper direct frame numbering period, or the number thereof in the direct frame numbering period.

Additionally, according to the present invention, proposed is user equipment, including: a processor; and a memory storing instructions, wherein the instructions, when run by the processor, perform the above method.

According to the present invention, it is possible to derive a timing-related parameter of an SL such as a hyper direct frame number, a direct frame number, a direct half-frame number, a direct subframe number, and a direct slot number by using one or more of a time zero, a reference time, a target time, and a timing offset, for example, using a current UTC time, so that all user equipment (UE) and base stations and/or other entities operating on the SL can be synchronized in the timing parameter, ensuring correct transmission and reception of the user equipment (UE) and base stations and/or other entities on the SL.

BRIEF DESCRIPTION OF THE DRAWINGS

The above and other features of the present invention will be more apparent from the following detailed description in combination with the accompanying drawings, in which.

DETAILED DESCRIPTION

Figure 1:
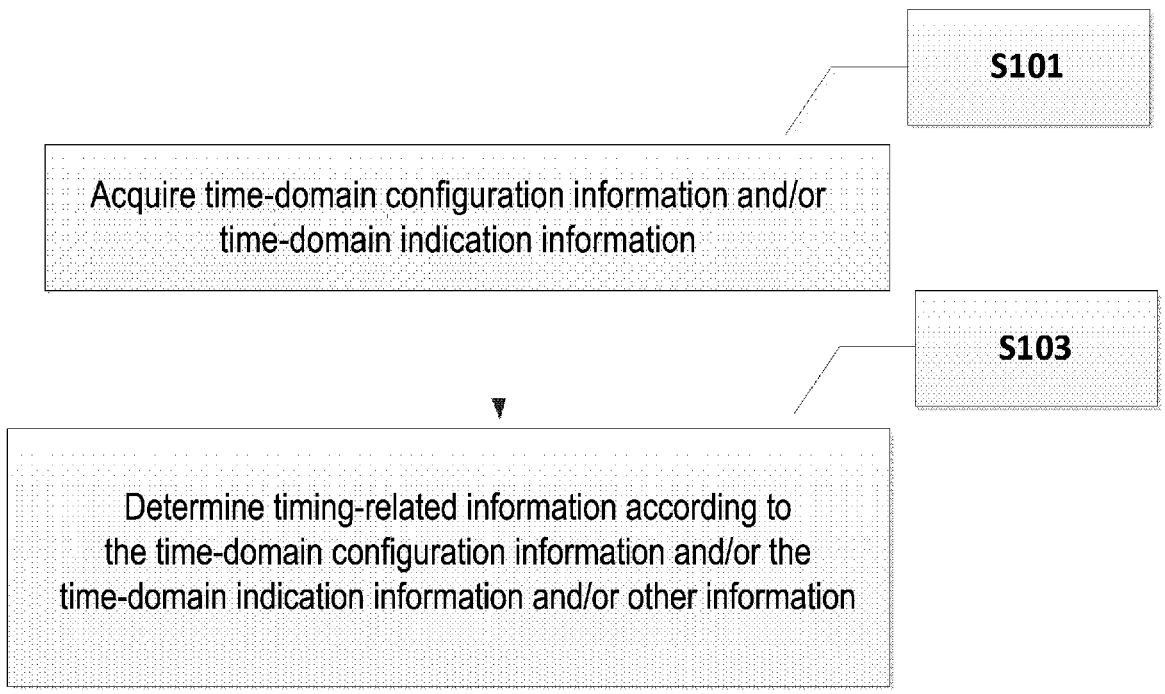
FIG. 1 is a flowchart showing a method performed by user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention, when applied to a specific system, the terms may be replaced with terms used in the corresponding system.

3GPP: 3rd Generation Partnership Project
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband, enhanced mobile broadband communication
eNB: E-UTRAN Node B
E-UTRAN: Evolved UMTS Terrestrial Radio Access Network
FDRA: Frequency Domain Resource Assignment
FR1: Frequency Range 1
FR2: Frequency Range 2
GLONASS: Global Navigation Satellite System
gNB: NR Node B
GNSS: Global Navigation Satellite System
GPS: Global Positioning System
HARQ: Hybrid Automatic Repeat Request
IE: Information Element
IP: Internet Protocol
LCID: Logical Channel ID, Logical Channel Identifier
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-V2X
MIB-V2X: Master Information Block-V2X
mMTC: Massive Machine Type Communication
NAS: Non-Access Stratum
NDI: New Data Indicator
NR: New Radio
NUL: Normal Uplink OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSS: Secondary Synchronization Signal
SSSS: Secondary Sidelink Synchronization Signal
STAG: Secondary Timing Advance Group
SUL: Supplementary Uplink
TA: Timing Advance
TAG: Timing Advance Group
TB: Transport Block
TCP: Transmission Control Protocol
TDD: Time Division Duplexing
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything Unless otherwise specified, in all embodiments and implementations of the present invention, An SL MIB (Sidelink Master Information Block) may also be referred to as an S-MIB, or an MIB-SL. Optionally, when used in a V2X service, the SL MIB refers to an MIB-SL-V2X.

A synchronization reference source may also be referred to as a synchronization reference, or a synchronization source.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, time-domain configuration information and/or time-domain indication information is acquired, wherein:

the time-domain configuration information and/or the time-domain indication information may include one or more of the following:

Time zero, wherein:

Optionally, the time zero may use UTC (Coordinated Universal Time, also known as world uniform time, or world standard time, or international coordinated time), or may use GMT (Greenwich Mean Time), or may use other time standards and/or time formats.

Optionally, the time zero may be represented by a numerical value (for example, a real number, or a decimal number, or a fractional number, or an integer), denoted as $T_0$. For example, $T_0=0$.

Optionally, the value of the time zero may be expressed in milliseconds, or in seconds, or in microseconds, or in nanoseconds, or in other time units.

Optionally, the time zero may be a predefined time. For example, the time zero may be 00:00:00 on Jan. 1, 1900 in the Gregorian calendar (in this case, optionally, the time zero may also be expressed as the midnight between Thursday, Dec. 31, 1899 and Friday, Jan. 1, 1900).

Optionally, the time zero may correspond to a time zero parameter (e.g., timeZero). The time zero parameter may be set as a predefined value, or may be configured or pre-configured in a semi-static manner, or may be indicated in a dynamic manner, wherein:

Optionally, the time zero parameter may be included in an RRC message or a PC5 RRC message, for example, included in an MIB, or included in an SIB, or included in an MIB-SL, or included in an PSBCH payload, or included in pre-configuration information, or included in default configuration information, or included in other RRC messages or PC5 RRC messages.

Optionally, the time zero parameter may be included in a MAC CE.

Optionally, the time zero parameter may be included in downlink control information (DCI).

Optionally, the time zero parameter may be included in sidelink control information (SCI).

Optionally, the time zero may not be explicitly defined. For example, when the elapsed time (e.g., expressed in milliseconds) that has elapsed from a first time (e.g., a reference time as mentioned below) to a second time (e.g., a target time as mentioned below) is being determined, the elapsed time may be independent of a specific definition of the time zero.

Reference time, wherein:

Optionally, the reference time may use UTC, or may use GMT, or may use other time standards and/or time formats.

Optionally, the reference time may be represented by a numerical value (for example, a real number, or a decimal number, or a fractional number, or an integer), denoted as $T_{ref}$.

Optionally, the value of the reference time may be expressed in milliseconds, or in seconds, or in microseconds, or in nanoseconds, or in other time units.

Optionally, the value of the reference time may be equal to the elapsed time (e.g., expressed in milliseconds) that has elapsed from the time zero to the reference time.

Optionally, the reference time may be a predefined time. For example, the reference time may be 00:00:00 on Jan. 1, 1900 in the Gregorian calendar (in this case, optionally, the reference time may also be expressed as the midnight between Thursday, Dec. 31, 1899 and Friday, Jan. 1, 1900.)

Optionally, the reference time and the time zero may be the same time (e.g., in this case, $T_{ref}=0$).

Optionally, the reference time may correspond to a reference-time parameter (e.g., refTime). The reference time parameter may be set to a predefined value, or may be configured or pre-configured in a semi-static manner, or may be indicated in a dynamic manner, wherein:

Optionally, the reference time parameter may be included in an RRC message or a PC5 RRC message, for example, included in an MIB, or included in an SIB, or included in an MIB-SL, or included in an PSBCH payload, or included in pre-configuration information, or included in default configuration information, or included in other RRC messages or PC5 RRC messages.

Optionally, the reference time parameter may be included in a MAC CE.

Optionally, the reference time parameter may be included in downlink control information (DCI).

Optionally, the reference time parameter may be included in sidelink control information (SCI).

Target time, wherein:

Optionally, the target time may use UTC, or may use GMT, or may use other time standards and/or time formats.

Optionally, the target time may be represented by a numerical value (for example, a real number, or a decimal number, or a fractional number, or an integer), denoted as $T_{target}$.

Optionally, the value of the target time may be expressed in milliseconds, or in seconds, or in microseconds, or in nanoseconds, or in other time units.

Optionally, the value of the target time may be equal to the elapsed time (e.g., expressed in milliseconds) that has elapsed from the time zero to the target time.

Optionally, the target time may be a current time. In this case, optionally, $T_{target}$ may also be denoted as $T_{currect}$.

Optionally, the target time may be a specified time in the past or in the future.

Optionally, the target time may correspond to a target time parameter (e.g., targetTime). The target time parameter may be set to a predefined value, or may be configured or pre-configured in a semi-static manner, or may be indicated in a dynamic manner, wherein:

Optionally, the target time parameter may be included in an RRC message or a PC5 RRC message, for example, included in an MIB, or included in an SIB, or included in an MIB-SL, or included in an PSBCH payload, or included in pre-configuration information, or included in default configuration information, or included in other RRC messages or PC5 RRC messages.

Optionally, the target time parameter may be included in a MAC CE.

Optionally, the target time parameter may be included in downlink control information (DCI).

Optionally, the target time parameter may be included in sidelink control information (SCI).

Optionally, the target time may be acquired from a GNSS, wherein:

Optionally, when the UE selects a GNSS as a synchronization reference source, the target time is acquired from the GNSS.

Optionally, the GNSS may be the GPS (Global Positioning System), or may be the GLONASS (Global Navigation Satellite System), or may be the BeiDou (BeiDou Navigation Satellite System), or may be the Galileo (Galileo Navigation Satellite System), or may be the QZSS (Quasi-Zenith Satellite System), or may be other satellite systems, or may be a combination of different satellite systems.

Optionally, the target time may be acquired from an internal clock of the UE, or may be acquired from a gNB, or may be acquired from an eNB, or may be acquired from other UE(s), or may be acquired from other time sources or clock sources.

Timing offset, wherein:
   Optionally, the timing offset may be represented by a numerical value (for example, a real number, or a decimal number, or a fractional number, or an integer), denoted as $\Delta_T$.
   Optionally, the value of the timing offset may be expressed in milliseconds, or in seconds, or in microseconds, or in nanoseconds, or in other time units.
   Optionally, the timing offset may be a predefined value. For example, $\Delta_T=0$.
   Optionally, the timing offset may correspond to a timing offset parameter (e.g., offsetDFN). The timing offset parameter may be set to a predefined value, or may be configured or pre-configured in a semi-static manner, or may be indicated in a dynamic manner, wherein:
      Optionally, the value of the timing offset parameter is from a predefined set. For example, the predefined set may be $\{0, 1, \ldots, 1000\}$, where 0 corresponds to 0 milliseconds, 1 corresponds to 0.001 milliseconds, 2 corresponds to 0.002 milliseconds, and so on. Optionally, there is one corresponding element $-x$ for each non-zero element x in the predefined set.
      Optionally, if the timing offset parameter has been configured, then $\Delta_T$ is equal to a value configured by the timing offset parameter; otherwise $\Delta_T=0$.
      Optionally, if the timing offset parameter has been indicated, then $\Delta_T$ is equal to a value indicated by the timing offset parameter; otherwise $\Delta_T=0$.
      Optionally, the timing offset parameter may be included in an RRC message or a PC5 RRC message, for example, included in an MIB, or included in an SIB, or included in an MIB-SL, or included in an PSBCH payload, or included in pre-configuration information, or included in default configuration information, or included in other RRC messages or PC5 RRC messages.
      Optionally, the timing offset parameter may be included in a MAC CE.
      Optionally, the timing offset parameter may be included in downlink control information (DCI).
      Optionally, the timing offset parameter may be included in sidelink control information (SCI).
   Additionally, in step S103, timing-related information is determined according to the time-domain configuration information and/or the time-domain indication information and/or other information. For example, timing information of a sidelink (SL) is determined.
   wherein:
      Optionally, the sidelink is an interface for communication between UEs. Optionally, the interface may also be referred to as an PC5 interface. Optionally, the communication between the UEs may be referred to as sidelink communication or SL communication (e.g., V2X SL communication). Optionally, the SL communication occurs between two or more neighboring UEs. Optionally, the SL communication uses NR technology; optionally, in this case, the SL communication may also be referred to as NR SL communication. Optionally, the SL communication does not traverse any network node (e.g., a gNB, etc.).
      Optionally, the timing-related information may be used for the SL communication, or may be used for other purposes.
      Optionally, a subcarrier spacing configuration (SCS configuration) corresponding to the sidelink may be $\mu$. For example, a subcarrier spacing configuration (pre)configured for an SL carrier corresponding to the sidelink is $\mu$. As another example, a subcarrier spacing configuration (pre)configured for an SL BWP corresponding to the sidelink is $\mu$. As another example, a subcarrier spacing configuration (pre)configured for an SL SSB (or S-SSB) corresponding to the sidelink is $\mu$. As another example, a subcarrier spacing configuration (pre)configured for a resource pool corresponding to the sidelink is $\mu$, wherein:
         Optionally, the subcarrier spacing (SCS) corresponding to $\mu$ may be $\Delta f$. For example, $\mu=0$ corresponds to $\Delta f=15$ kHz. As another example, $\mu=1$ corresponds to $\Delta f=30$ kHz. As another example, $\mu=2$ corresponds to $\Delta f=60$ kHz. As another example, $\mu=3$ corresponds to $\Delta f=120$ kHz. As another example, $\mu=4$ corresponds to $\Delta f=240$ kHz. As another example, for any given $\rho$, $\Delta f=2^\mu \cdot 15$ kHz.
      Optionally, in a frame structure corresponding to the sidelink,
         optionally, each hyper direct frame (or referred to as a direct hyper frame) numbering period may include $N_{hyperd1recframe}^{\mu}$ hyper direct frames. Optionally, $N_{hyperdirectframe}^{\mu}$ may be equal to 1024, or may be equal to other values.
         Optionally, each hyper direct frame may include $N_{directframe}^{hyperdirectframe,\mu}$ direct frames. Optionally, $N_{directframe}^{hyperdirectframe,\mu}$ may be equal to 1024, or may be equal to other values.
         Optionally, one or more of the hyper direct frame, $N_{hyperdirectframe}^{\mu}$, and $N_{directframe}^{hyperdirectframe,\mu}$ are not defined.
         Optionally, each direct frame numbering period may include $N_{directframe}^{\mu}$ direct frames. Optionally, $N_{directframe}^{\mu}$ may be equal to 1024, or may be equal to other values.
         Optionally, each direct frame may include $N_{directhalfframe}^{directframe,\mu}$ direct half frames. Optionally, $N_{directhalfframe}^{directframe,\mu}$ may be equal to 2, or may be equal to other values.
         Optionally, each direct frame may include $N_{directsubframe}^{directframe,\mu}$ direct subframes. Optionally, $N_{directsubframe}^{directframe,\mu}$ may be equal to 10, or may be equal to other values.
         Optionally, each direct frame may include $N_{directslot}^{directframe,\mu}$ direct slots. Optionally, the value of $N_{directslot}^{directframe,\mu}$ may be related to $\mu$. For example, if $\mu=0$, then $N_{directslot}^{directframe,\mu}=10$. As another example, if $\mu=1$, then $N_{directslot}^{directframe,\mu}=20$. As another example, if $\mu=2$, then $N_{directslot}^{directframe,\mu}=40$. As another example, if $\mu=3$, then $N_{directslot}^{directframe,\mu}=80$. As another example, if $\mu=4$, then $N_{directslot}^{directframe,\mu}=160$. As another example, for any $\mu$, $N_{directslot}^{directframe,\mu}=10 \cdot 2^\mu$.
         Optionally, each direct half frame may include $N_{directsubframe}^{directhalfframe,\mu}$ direct subframes. Optionally, $N_{directsubframe}^{directhalfframe,\mu}$ may be equal to 5, or may be equal to other values.
         Optionally, each direct half frame may include $N_{directslot}^{directhalfframe,\mu}$ direct slots. Optionally, the value of $N_{directslot}^{directhalfframe,\mu}$ may be related to $\mu$.

For example, if $\mu=0$, then $N_{directslot}^{directhalfframe,\mu}=5$. As another example, if $\mu=1$, then $N_{directslot}^{directhalfframe,\mu}=10$. As another example, if $\mu=2$, then $N_{directslot}^{directhalfframe,\mu}=20$. As another example, if $\mu=3$, then $N_{directslot}^{directhalfframe,\mu}=40$. As another example, if $\mu=4$, then $N_{directslot}^{directhalfframe,\mu}=80$. As another example, for any $\mu$, $N_{directslot}^{directhalfframe,\mu}=5\cdot 2^\mu$.

Optionally, each direct subframe may include $N_{directslot}^{directsubframe,\mu}$ direct slots. Optionally, the value of $N_{directslot}^{directsubframe,\mu}$ may be related to $\mu$. For example, if $\mu=0$, then $N_{directslot}^{directsubframe,\mu}=1$. As another example, if $\mu=1$, then $N_{directslot}^{directsubframe,\mu}=2$. As another example, if $\mu=2$, then $N_{directslot}^{directsubframe,\mu}=4$. As another example, if $\mu=3$, then $N_{directslot}^{directsubframe,\mu}=8$. As another example, if $\mu=4$, then $N_{directslot}^{directsubframe,\mu}=16$. As another example, for any $\mu$, $N_{directslot}^{directsubframe,\mu}=2^\mu$.

Optionally, the length of each direct frame (or referred to as duration, denoted as $T_{directframe}^{\mu}$) may be equal to 10 milliseconds, or may be equal to other values.

Optionally, the length of each direct half frame (or referred to as duration, denoted as $T_{directhalfframe}^{\mu}$) may be equal to 5 milliseconds, or may be equal to other values.

Optionally, the length of each direct subframe (or referred to as duration, denoted as $T_{directsubframe}^{\mu}$) may be equal to 1 millisecond, or may be equal to other values.

Optionally, the length of each direct slot (or referred to as duration, denoted as $T_{directslot}^{\mu}$) may be related to $\mu$. For example, $T_{directslot}^{\mu}=10/N_{directslot}^{directsubframe,\mu}$ milliseconds. Optionally, if $N_{directslot}^{directsubframe,\mu}=10\cdot 2^\mu$, then $T_{directslot}^{\mu}=10/(10\cdot 2^\mu)=2^{-1}$ milliseconds. As another example, $T_{slot}^{\mu}=5/N_{directslot}^{directsubframe,\mu}$ milliseconds. Optionally, if $N_{directslot}^{directsubframe,\mu}=5\cdot 2^\mu$, then $T_{directslot}^{\mu}=5/(5\cdot 2^\mu)=2^{-\mu}$ milliseconds. As another example, $T_{directslot}^{\mu}=1/N_{directslot}^{directsubframe,\mu}$ milliseconds. Optionally, if $N_{directslot}^{directsubframe,\mu}=2^\mu$, then $T_{directslot}^{\mu}=1/2^\mu=2^{-\mu}$ milliseconds.

Figure 2:
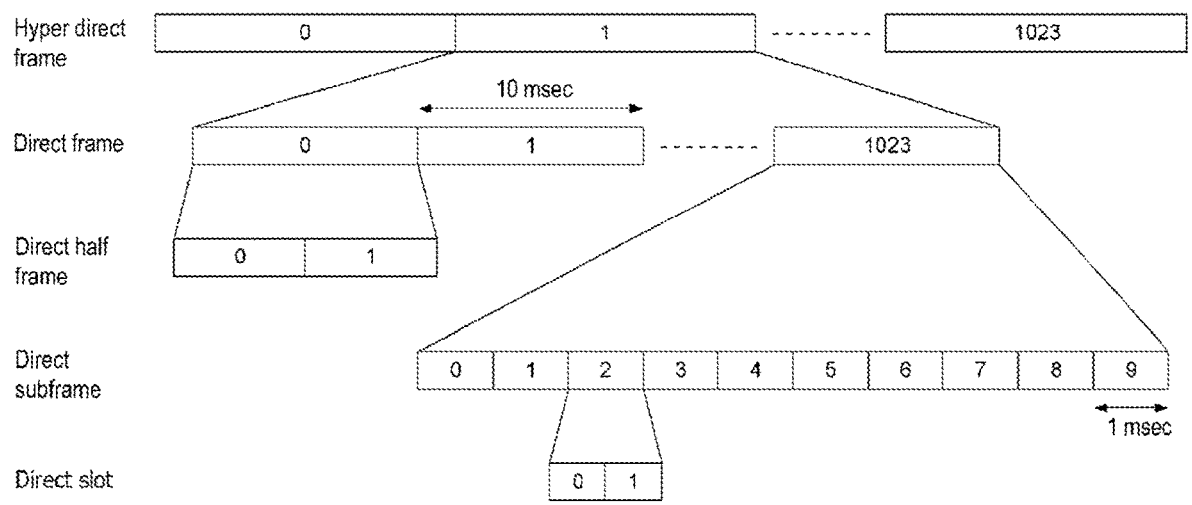
FIG. 2 is a diagram showing an example of a frame structure corresponding to a sidelink.

FIG. 2 gives one example of the frame structure, where $\mu=1$ (corresponding to $\Delta f=30$ kHz), $N_{hyperdirectframe}^{\mu}=1024$, $N_{directframe}^{hyperdirectframe,\mu}=1024$, $N_{directhalfframe}^{directframe,\mu}=2$, $N_{directsubframe}^{directframe,\mu}=10$, $N_{directsubframe}^{directhalfframe,\mu}=5$, $N_{directslot}^{directframe,\mu}=10\cdot 2^\mu=20$, $N_{directslot}^{directhalfframe,\mu}=5\cdot 2^\mu=10$, $N_{directslot}^{directsubframe,\mu}=2^\mu=2$, $T_{directframe}^{\mu}=10$ milliseconds, $T_{directhalfframe}^{\mu}=5$ milliseconds, $T_{directsubframe}^{\mu}=1$ milliseconds, $T_{directslot}^{\mu}=2^{-\mu}=0.5$ milliseconds. Optionally, $N_{directframe}^{\mu}=1024$ Optionally, one or more of the hyper direct frame, $N_{hyperdirectframe}^{\mu}$, and $N_{directframe}^{hyperdirectframe,\mu}$ are not defined.

Optionally, the timing information of the sidelink may include any one or more of the following:

Hyper direct frame number (H-DFN), denoted as $n_{hdfn}$. wherein:

Optionally, the hyper direct frame number may be the number of the hyper direct frame in a hyper direct frame numbering period. Optionally, a value set of the hyper direct frame number may be $\{0, 1, \ldots, N_{hyperdirectframe}^{\mu}-1\}$, or may be other sets.

Optionally, the hyper direct frame number may be calculated according to any one of the following:

$$n_{hdfn}=\lfloor(T_{target}-T_{ref}-\Delta_T)/(N_{directframe}^{hyperdirectframe,\mu}\cdot T_{directframe}^{\mu})\rfloor \bmod N_{hyperdirectframe}^{\mu}$$

$$n_{hdfn}=\lfloor(T_{target}-T_{ref}-\Delta_T)/(N_{directframe}^{\mu}\cdot T_{directframe}^{\mu})\rfloor \bmod N_{hyperdirectframe}^{\mu}$$

For example, if $N_{directframe}^{hyperdirectframe,\mu}=1024$, $N_{hyperdirectframe}^{\mu}=1024$, $N_{directframe}^{\mu}=1024$, $T_{directframe}^{\mu}=10$ milliseconds, then the hyper direct frame number may be calculated according to any one of the following:

$$n_{hdfn}=\lfloor(T_{target}-T_{ref}-\Delta_T)/10240\rfloor \bmod 1024$$

$$n_{hdfn}=\lfloor(T_{target}-T_{ref}-\Delta_T)/(1024\cdot 10)\rfloor \bmod 1024$$

$$n_{hdfn}=\lfloor 0.1\cdot\lfloor(T_{target}-T_{ref}-\Delta_T)/1024\rfloor\rfloor \bmod 1024$$

Direct frame number (DFN), denoted as $n_{dfn}$, wherein:

Optionally, the direct frame number may be the number of the direct frame in the hyper direct frame numbering period. Optionally, a value set of the direct frame number may be $\{0, 1, \ldots, N_{directframe}^{hyperdirectframe,\mu}\cdot N_{hyperdirectframe}^{\mu}-1\}$, or may be other sets.

Optionally, the direct frame number may be the number of the direct frame in a hyper direct frame. Optionally, a value set of the direct frame number may be $(0, 1, \ldots, N_{directframe}^{hyperdirectframe,\mu}$, or may be other sets.

Optionally, the direct frame number may be the number of the direct frame in a direct frame numbering period. Optionally, a value set of the direct frame number may be $\{0, 1, \ldots, N_{directframe}^{\mu}-1\}$, or may be other sets.

Optionally, the direct frame number may be calculated according to any one of the following:

$$n_{dfn}=\lfloor(T_{target}-T_{ref}-\Delta_T)/T_{directframe}^{\mu}\rfloor \bmod (N_{directframe}^{hyperdirectframe,\mu}\cdot N_{hyperdirectframe}^{\mu})$$

$$n_{dfn}=\lfloor(T_{target}-T_{ref}-\Delta_T)/T_{directframe}^{\mu}\rfloor \bmod N_{directframe}^{hyperdirectframe,\mu}$$

$$n_{dfn}=\lfloor(T_{target}-T_{ref}-\Delta_T)/T_{directframe}^{\mu}\rfloor \bmod N_{directframe}^{\mu}$$

For example, if $N_{directframe}^{hyperdirectframe,\mu}=1024$, $N_{hyperdirectframe}^{\mu}=1024$, $N_{directframe}^{\mu}=1024$, $T_{directframe}^{\mu}=10$ milliseconds, then the direct frame number may be calculated according to any one of the following:

$$n_{dfn}=\lfloor(T_{target}-T_{ref}-\Delta_T)/10\rfloor \bmod 1048576$$

$$n_{dfn}=\lfloor 0.1(T_{target}-T_{ref}-\Delta_T)\rfloor \bmod 1048576$$

$$n_{dfn}=\lfloor(T_{target}-T_{ref}-\Delta_T)/10\rfloor \bmod 1024$$

$$n_{dfn}=\lfloor 0.1\cdot(T_{target}-T_{ref}-\Delta_T)\rfloor \bmod 1024$$

Direct half frame number (DHFN), denoted as $n_{dhfn}$, wherein:

Optionally, the direct half frame number may be the number of the direct half frame in the hyper direct frame numbering period. Optionally, a value set of the direct half frame number may be $\{0, 1, \ldots, N_{directhalfframe}^{directframe,\mu}\cdot N_{directframe}^{hyperdirectframe,\mu}\cdot N_{hyperdirectframe}^{\mu}-1\}$, or may be other sets.

Optionally, the direct half frame number may be the number of the direct half frame in a hyper direct frame. Optionally, the value set of the direct half frame number may be $\{0, 1, \ldots, N_{directhalfframe}^{directframe,\mu}\cdot N_{directframe}^{hyperdirectframe,\mu}\}$, or may be other sets.

Optionally, the direct half frame number may be the number of the direct half frame in the direct frame numbering period. Optionally, the value set of the direct half frame number may be $\{0, 1, \ldots, N_{directhalfframe}^{directframe,\mu}\cdot N_{directframe}^{\mu}-1\}$, or may be other sets.

Optionally, the direct half frame number may be the number of the direct half frame in a direct frame. Optionally, the value set of the direct half frame number may be $\{0, 1, \ldots, N_{directhalfframe}^{directframe,\mu}-1\}$, or may be other sets.

Optionally, the direct half frame number may be calculated according to any one of the following:

$$n_{dhfn}=\lfloor(T_{target}-T_{ref}-\Delta_T)/T_{directhalfframe}^{\mu}\rfloor \bmod (N_{directhalfframe}^{directframe,\mu}\cdot N_{directframe}^{hyperdirectframe,\mu}\cdot N_{hyperdirectframe}^{\mu})$$

$$n_{dhfn}=\lfloor(T_{target}-T_{ref}-\Delta_T)/T_{directhalfframe}^{\mu}\rfloor \bmod N_{directhalfframe}^{directframe,\mu}\cdot N_{directframe}^{hyperdirectframe,\mu})$$

$$n_{dhfn}=\lfloor(T_{target}-T_{ref}-\Delta_T)/T_{directhalfframe}^{\mu}\rfloor \bmod (N_{directhalfframe}^{directframe,\mu}\cdot N_{directframe}^{\mu})$$

$$n_{dhfn}=\lfloor(T_{target}-T_{ref}-\Delta_T)/T_{directhalfframe}^{\mu}\rfloor \bmod N_{directhalfframe}^{directframe,\mu}$$

For example, if $N_{directframe}^{hyperdirectframe,\mu}=1024$, $N_{hyperdirectframe}^{\mu}=1024$, $N_{directframe}^{\mu}=1024$, $N_{directhalfframe}^{directframe,\mu}=2$, $T_{directhalfframe}^{\mu}=5$ milliseconds, then the direct half frame number may be calculated according to any one of the following:

$$n_{dhfn}=\lfloor(T_{target}-T_{ref}-\Delta T)/5\rfloor \bmod 2097152$$

$$n_{dhfn}=\lfloor 0.2\cdot(T_{target}-T_{ref}-\Delta_T)\rfloor \bmod 2097152$$

$$n_{dhfn}=\lfloor(T_{target}-T_{ref}-\Delta T)/5\rfloor \bmod 2048$$

$$n_{dhfn}=\lfloor 0.2\cdot(T_{target}-T_{ref}-\Delta_T)\rfloor \bmod 2048$$

$$n_{dhfn}=\lfloor(T_{target}-T_{ref}-\Delta T)/5\rfloor \bmod 2$$

$$n_{dhfn}=\lfloor 0.2\cdot(T_{target}-T_{ref}-\Delta_T)\rfloor \bmod 2$$

Direct subframe number, denoted as $n_{directsubframe}$. wherein:

Optionally, the direct subframe number may be the number of the direct subframe in the hyper direct frame numbering period. Optionally, a value set of the direct subframe number may be $\{0, 1, \ldots, N_{directsubframe}^{directframe,\mu}\cdot N_{directframe}^{hyperdirectframe,\mu}\cdot N_{hyperdirectframe}^{\mu}-1\}$, or may be $\{0, 1, \ldots, N_{directsubframe}^{directhalfframe,\mu}\cdot N_{directhalfframe}^{directframe,\mu}\cdot N_{directframe}^{hyperdirectframe,\mu}\cdot N_{hyperdirectframe}^{\mu}-1\}$, or may be other sets.

Optionally, the direct subframe number may be the number of the direct subframe in a hyper direct frame. Optionally, the value set of the direct subframe number may be $\{0, 1, \ldots, N_{directsubframe}^{directframe,\mu}\cdot N_{directframe}^{hyperdirectframe,\mu}-1\}$ or may be $\{0, 1, \ldots, N_{directsubframe}^{directhalfframe,\mu}\cdot N_{directhalfframe}^{directframe,\mu}\cdot N_{directframe}^{hyperdirectframe,\mu}-1\}$, or may be other sets.

Optionally, the direct subframe number may be the number of the direct subframe in the direct frame numbering period. Optionally, the value set of the direct subframe number may be $\{0, 1, \ldots, N_{directsubframe}^{directframe,\mu}\cdot N_{directframe}^{\mu}-1\}$, or may be $\{0, 1, \ldots, N_{directsubframe}^{directhalfframe,\mu}\cdot N_{directhalfframe}^{directframe,\mu}\cdot N_{directframe}^{\mu}-1\}$, or may be other sets.

Optionally, the direct subframe number may be the number of the direct subframe in a direct frame. Optionally, the value set of the direct subframe number may be $\{0, 1, \ldots, N_{directsubframe}^{directframe,\mu}-1\}$, or may be $\{0, 1, \ldots, N_{directsubframe}^{directhalfframe,\mu}\cdot N_{directhalfframe}^{directframe,\mu}-1\}$, or may be other sets.

Optionally, the direct subframe number may be the number of the direct subframe in a direct half frame. Optionally, the value set of the direct subframe number may be $\{0, 1, \ldots, N_{directsubframe}^{directhalfframe,\mu}-1\}$, or may be other sets.

Optionally, the direct subframe number may be calculated according to any one of the following:

$$n_{directsubframe}=\lfloor(T_{target}-T_{ref}-\Delta_T)/T_{directsubframe}^{\mu}\rfloor \bmod (N_{directsubframe}^{directframe,\mu}\cdot N_{directframe}^{hyperdirectframe,\mu}\cdot N_{hyperdirectframe}^{\mu})$$

$$n_{directsubframe}=\lfloor(T_{target}-T_{ref}-\Delta_T)/T_{directsubframe}^{\mu}\rfloor \bmod (N_{directsubframe}^{directhalfframe,\mu}\cdot N_{directhalfframe}^{directframe,\mu}\cdot N_{directframe}^{hyperdirectframe,\mu}\cdot N_{hyperdirectframe}^{\mu})$$

$$n_{directsubframe}=\lfloor(T_{target}-T_{ref}-\Delta_T)T_{directsubframe}^{\mu}\rfloor \bmod (N_{directsubframe}^{directframe,\mu}\cdot N_{directframe}^{hyperdirectframe,\mu})$$

$$n_{directsubframe}=\lfloor(T_{target}-T_{ref}-\Delta_T)/T_{directsubframe}^{\mu}\rfloor \bmod (N_{directsubframe}^{directhalfframe,\mu}\cdot N_{directhalfframe}^{directframe,\mu}\cdot N_{directframe}^{hyperdirectframe,\mu})$$

$$n_{directsubframe}=\lfloor(T_{target}-T_{ref}-\Delta_T)/T_{directsubframe}^{\mu}\rfloor \bmod (N_{directsubframe}^{directframe,\mu}\cdot N_{directframe}^{\mu})$$

$$n_{directsubframe}=\lfloor(T_{target}-T_{ref}-\Delta_T)/T_{directsubframe}^{\mu}\rfloor \bmod (N_{directsubframe}^{directhalfframe,\mu}\cdot N_{directhalfframe}^{directframe,\mu}\cdot N_{directframe}^{\mu})$$

$$n_{directsubframe}=\lfloor(T_{target}-T_{ref}-\Delta_T)/T_{directsubframe}^{\mu}\rfloor \bmod N_{directsubframe}^{directframe,\mu}$$

$$n_{directsubframe}=\lfloor(T_{target}-T_{ref}-\Delta_T)T_{directsubframe}^{\mu}\rfloor \bmod (N_{directsubframe}^{directhalfframe,\mu}\cdot N_{directhalfframe}^{directframe,\mu})$$

$$n_{directsubframe}=\lfloor(T_{target}-T_{ref}-\Delta_T)/T_{directsubframe}^{\mu}\rfloor \bmod N_{directsubframe}^{directhalfframe,\mu}$$

For example, if $N_{directframe}^{hyperdirectframe,\mu}=1024$, $N_{directframe}^{\mu}=1024$, $N_{directhalfframe}^{directframe,\mu}=2$, $N_{directsubframe}^{directframe,\mu}=10$, $N_{directsubframe}^{directhalfframe,\mu}=5$, $T_{directsubframe}^{\mu}=1$ millisecond, then the direct subframe number may be calculated according to any one of the following:

$$n_{directsubframe}=\lfloor T_{target}-T_{ref}-\Delta_T \rfloor \bmod 10485760$$

$$n_{directsubframe}=\lfloor T_{Target}-T_{ref}-\Delta_T \rfloor \bmod 10240$$

$$n_{directsubframe}=\lfloor T_{target}-T_{ref}-\Delta_T \rfloor \bmod 10$$

$$n_{directsubframe}=\lfloor T_{Target}-T_{ref}-\Delta_T \rfloor \bmod 5$$

Direct slot number, denoted as $n_{directslot}$, wherein:

Optionally, the direct slot number may be the number of the direct slot in the hyper direct frame numbering period. Optionally, a value set of the direct slot number may be $\{0, 1, \ldots, N_{directslot}^{directframe,\mu} \cdot N_{directframe}^{hyperdirectframe,\mu} \cdot N_{hyperdirectframe}^{\mu}-1\}$, or may be $\{0, 1, \ldots, N_{directslot}^{subframe,\mu} \cdot N_{directsubframe}^{directframe,\mu} \cdot N_{directframe}^{hyperdirectframe,\mu} \cdot N_{hyperdirectframe}^{\mu}-1\}$, or may be $\{0, 1, \ldots, N_{directslot}^{directhalfframe,\mu} \cdot N_{directhalfframe}^{directframe,\mu} \cdot N_{directframe}^{hyperdirectframe,\mu} \cdot N_{hyperdirectframe}^{\mu}-1\}$, or may be $\{0, 1, \ldots, N_{directslot}^{directsubframe,\mu} \cdot N_{directsubframe}^{directhalfframe,\mu} \cdot N_{directhalfframe}^{directframe,\mu} \cdot N_{directframe}^{hyperdirectframe,\mu} \cdot N_{hyperdirectframe}^{\mu}-1\}$, or may be other sets.

Optionally, the direct slot number may be the number of the direct slot in a hyper direct frame. Optionally, the value set of the direct slot number may be $\{0, 1, \ldots, N_{directslot}^{directframe,\mu} \cdot N_{directframe}^{hyperdirectframe,\mu}-1\}$, or may be $\{0, 1, \ldots, N_{directslot}^{directsubframe,\mu} \cdot N_{directsubframe}^{directframe,\mu} \cdot N_{directframe}^{hyperdirectframe,\mu}-1\}$, or may be $\{0, 1, \ldots, N_{directslot}^{directhalfframe,\mu} \cdot N_{directhalfframe}^{directframe,\mu} \cdot N_{directframe}^{hyperdirectframe,\mu}-1\}$, or may be $\{0, 1, \ldots, N_{directslot}^{directsubframe,\mu} \cdot N_{directsubframe}^{directhalfframe,\mu} \cdot N_{directhalfframe}^{directframe,\mu} \cdot N_{directframe}^{hyperdirectframe,\mu}-1\}$, or may be other sets.

Optionally, the direct slot number may be the number of the direct slot in the direct frame numbering period. Optionally, the value set of the direct slot number may be $\{0, 1, \ldots, N_{directslot}^{directframe,\mu} \cdot N_{directframe}^{\mu}-1\}$, or may be $\{0, 1, \ldots, N_{directslot}^{directsubframe,\mu} \cdot N_{directsubframe}^{directframe,\mu} \cdot N_{directframe}^{\mu}-1\}$, or may be $\{0, 1, \ldots, N_{directslot}^{directhalfframe,\mu} \cdot N_{directhalfframe}^{directframe,\mu} \cdot N_{directframe}^{\mu}-1\}$, or may be $\{0, 1, \ldots, N_{directslot}^{directsubframe,\mu} \cdot N_{directsubframe}^{directhalfframe,\mu} \cdot N_{directhalfframe}^{directframe,\mu} \cdot N_{directframe}^{\mu}-1\}$, or may be other sets.

Optionally, the direct slot number may be the number of the direct slot in a direct frame. Optionally, the value set of the direct slot number may be $\{0, 1, \ldots, N_{directslot}^{directframe,\mu}-1\}$, or may be $\{0, 1, \ldots, N_{directslot}^{directsubframe,\mu} \cdot N_{directsubframe}^{directframe,\mu}-1\}$, or may be $\{0, 1, \ldots, N_{directslot}^{directhalfframe,\mu} \cdot N_{directhalfframe}^{directframe,\mu}-1\}$, or may be $\{0, 1, \ldots, N_{directslot}^{directsubframe,\mu} \cdot N_{directsubframe}^{directhalfframe,\mu} \cdot N_{directhalfframe}^{directframe,\mu}-1\}$, or may be other sets.

Optionally, the direct slot number may be the number of the direct slot in a direct half frame. Optionally, the value set of the direct slot number may be $\{0, 1, \ldots, N_{directslot}^{directsubframe,\mu}-1\}$, or may be $\{0, 1, \ldots, N_{directslot}^{directsubframe,\mu} \cdot N_{directsubframe}^{directhalfframe,\mu}-1\}$, or may be other sets.

Optionally, the direct slot number may be the number of the direct slot in a direct subframe. Optionally, the value set of the direct slot number may be $\{0, 1, \ldots, N_{directslot}^{directsubframe,\mu}-1\}$, or may be other sets.

Optionally, the direct slot number may be calculated according to any one of the following:

$$n_{directslot}=\lfloor (T_{target}-T_{ref}-\Delta_T)/T_{directslot}^{\mu} \rfloor \bmod (N_{directslot}^{directframe,\mu} \cdot N_{directframe}^{hyperdirectframe,\mu} \cdot N_{hyperdirectframe}^{\mu})$$

$$n_{directslot}=\lfloor (T_{target}-T_{ref}-\Delta_T)/T_{directslot}^{\mu} \rfloor \bmod (N_{directslot}^{directsubframe,\mu} \cdot N_{directsubframe}^{directframe,\mu} \cdot N_{directframe}^{hyperdirectframe,\mu} \cdot N_{hyperdirectframe}^{\mu})$$

$$n_{directslot}=\lfloor (T_{target}-T_{ref}-\Delta_T)/T_{directslot}^{\mu} \rfloor \bmod (N_{directslot}^{directhalfframe,\mu} \cdot N_{directhalfframe}^{directframe,\mu} \cdot N_{directframe}^{hyperdirectframe,\mu} \cdot N_{hyperdirectframe}^{\mu})$$

$$n_{directslot}=\lfloor (T_{target}-T_{ref}-\Delta_T)/T_{directslot}^{\mu} \rfloor \bmod (N_{directslot}^{directsubframe,\mu} \cdot N_{directsubframe}^{directhalfframe,\mu} \cdot N_{directhalfframe}^{directframe,\mu} \cdot N_{directframe}^{hyperdirectframe,\mu} \cdot N_{hyperdirectframe}^{\mu})$$

$$n_{directslot}=\lfloor (T_{target}-T_{ref}-\Delta_T)/T_{directslot}^{\mu} \rfloor \bmod (N_{directslot}^{directframe,\mu} \cdot N_{directframe}^{\mu})$$

$$n_{directslot}=\lfloor (T_{target}-T_{ref}-\Delta_T)/T_{directslot}^{\mu} \rfloor \bmod (N_{directslot}^{directsubframe,\mu} \cdot N_{directsubframe}^{directframe,\mu} \cdot N_{directframe}^{\mu})$$

$$n_{directslot}=\lfloor (T_{target}-T_{ref}-\Delta_T)/T_{directslot}^{\mu} \rfloor \bmod (N_{directslot}^{directhalfframe,\mu} \cdot N_{directhalfframe}^{directframe,\mu} \cdot N_{directframe}^{\mu})$$

$$n_{directslot}=\lfloor (T_{target}-T_{ref}-\Delta_T)/T_{directslot}^{\mu} \rfloor \bmod (N_{directslot}^{directsubframe,\mu} \cdot N_{directsubframe}^{directhalfframe,\mu} \cdot N_{directhalfframe}^{directframe,\mu} \cdot N_{directframe}^{\mu})$$

$$n_{directslot}=\lfloor (T_{target}-T_{ref}-\Delta_T)/T_{directslot}^{\mu} \rfloor \bmod (N_{directslot}^{directframe,\mu})$$

$$n_{directslot}=\lfloor (T_{target}-T_{ref}-\Delta_T)T_{directslot}^{\mu} \rfloor \bmod (N_{directslot}^{directsubframe,\mu} \cdot N_{directsubframe}^{directframe,\mu})$$

$n_{directslot} = \lfloor (T_{target} - T_{ref} - \Delta_T)/T_{directslot}^\mu \rfloor$
  $\mod(N_{directslot}^{directhalfframe,\mu} \cdot N_{directhalfframe}^{directframe,\mu})$ $n_{directslot} = \lfloor (T_{target} - T_{ref} - \Delta_T)/T_{directslot}^\mu \rfloor \mod$
  $N_{directslot}^{directsubframe,\mu} \cdot$
  $N_{directsubframe}^{directhalfframe,\mu} \cdot$
  $N_{directhalfframe}^{directframe,\mu})$ $n_{directslot} = \lfloor (T_{target} - T_{ref} - \Delta_T)/T_{directslot}^\mu \rfloor \mod$
  $N_{directslot}^{directhalfframe,\mu}$ $n_{directslot} = \lfloor (T_{target} - T_{ref} - \Delta_T)/T_{directslot}^\mu \rfloor \mod$
  $N_{directslot}^{directsubframe,\mu} \cdot$
  $N_{directsubframe}^{directhalfframe,\mu})$ $n_{directslot} = \lfloor (T_{target} - T_{ref} - \Delta_T)/T_{directslot}^\mu \rfloor \mod$
  $N_{directslot}^{directsubframe,\mu}$ $n_{directslot} = (T_{target} - T_{ref} - \Delta_T) - \lfloor T_{target} - T_{ref} - \Delta_T \rfloor / T_{directslot}^\mu \rfloor$ For example, if $N_{directframe}^{hyperdirectframe,\mu} = 1024$, $N_{directframe}^\mu = 1024$, $N_{hyperdirectframe}^\mu = 1024$, $N_{directslot}^{directframe,\mu} = 10 \cdot 2^\mu$, $N_{directsubframe}^{directframe,\mu} = 10$, $N_{directslot}^{directsubframe,\mu} = 2^\mu$, $N_{directframe}^{directframe,\mu} = 2$, $N_{directsubframe}^{directhalfframe,\mu} = 5$, $N_{directslot}^{directhalfframe,\mu} = 5 \cdot 2^\mu$, $T_{directslot}^\mu = 1/2^\mu = 2^{-\mu}$ milliseconds, then the direct slot number may be calculated according to any one of the following:

$n_{directslot} = \lfloor N_{directslot}^{directsubframe,\mu} \cdot (T_{target} - T_{ref} - \Delta_T) \rfloor$
  $\mod(N_{directslot}^{directframe,\mu} \cdot 1048576)$ $n_{slot} = \lfloor 2^\mu \cdot (T_{target} - T_{ref} - \Delta^T) \rfloor \mod(2^\mu \cdot 10485760)$ $n_{directsubframe} = \lfloor N_{directslot}^{directsubframe,\mu} \cdot (T_{target} - T_{ref} - \Delta_T) \rfloor \mod(N_{directslot}^{directframe,\mu} \cdot 1024)$ $n_{directslot} = \lfloor 2^\mu \cdot (T_{target} - T_{ref} - \Delta_T) \rfloor \mod(2^\mu \cdot 10240)$ $n_{directslot} = \lfloor N_{directslot}^{directsubframe,\mu} \cdot (T_{target} - T_{ref} - \Delta_T) \rfloor$
  $\mod N_{directslot}^{directframe,\mu}$ $n_{directslot} = \lfloor 2^\mu (T_{target} - T_{ref} - \Delta_T) \mod(2^\mu \cdot 10)$ $n_{directslot} = \lfloor N_{directslot}^{directsubframe,\mu} \cdot (T_{target} - T_{ref} - \Delta_T) \rfloor$
  $\mod N_{directslot}^{directhalfframe,\mu}$ $n_{directslot} = \lfloor 2^\mu \cdot \lfloor (T_{target} - T_{ref} - \Delta_T) \rfloor \rfloor \mod(2^\mu \cdot 5)$ $n_{directslot} = \lfloor N_{directslot}^{directsubframe,\mu} \cdot (T_{target} - T_{ref} - \Delta_T) \rfloor$
  $\mod N_{directslot}^{directsubframe,\mu}$ $n_{directslot} = \lfloor 2^\mu \cdot (T_{target} - T_{ref} - \Delta_T) \rfloor \mod 2^\mu$ $n_{directslot} = \lfloor N_{directslot}^{directsubframe,\mu} \cdot ((T_{Target} - T_{ref} - \Delta_T) - \lfloor T_{target} - T_{ref} - \Delta_T \rfloor) \rfloor$ $n_{directslot} = \lfloor 2^\mu \cdot ((T_{Target} - T_{ref} - \Delta_T) - \lfloor T_{target} - T_{ref} - \Delta_T \rfloor) \rfloor$ wherein:
  Optionally, the "calculating" may also be referred to as "deducing", or may be referred to as "deriving."
  Optionally, in the above calculations of the hyper direct frame number, the direct frame number, the direct half frame number, the direct subframe number, and the direct slot number, it is assumed that $T_{target}$, $T_{ref}$, and $\Delta_T$ are expressed in milliseconds. Optionally, $T_{target}$, $T_{ref}$, and $\Delta_T$ may be expressed in time units other than milliseconds, in which case $(T_{target} - T_{ref} - \Delta_T)$ needs to be replaced with $C \cdot (T_{target} - T_{ref} - \Delta_T)$ so that $C \cdot (T_{target} - T_{ref} - \Delta_T)$ is expressed in milliseconds, where C is a constant. For example, if $T_{target}$, $T_{ref}$, and $\Delta_T$ are expressed in seconds, then C=1000.

Optionally, in Embodiment 1 of the present invention, $T_{target} - T_{ref}$ may be replaced with $T_{elapsed}$, where $T_{elapsed}$ is equal to the elapsed time that has elapsed from the reference time to the target time, wherein:
  Optionally, $T_{elapsed}$ may be a numerical number, for example, a real number, or a decimal number, or a fractional number, or an integer.
  Optionally, $T_{elapsed}$ may be expressed in milliseconds, or in seconds, or in microseconds, or in nanoseconds, or in other time units.

Optionally, in Embodiment 1 of the present invention, $T_{target} - T_{ref} - \Delta_T$ may be replaced with $T_{target} - T_{ref} + \Delta_T$.

Optionally, in Embodiment 1 of the present invention, the timing offset may not be defined. In this case, $T_{target} - T_{ref} - \Delta_T$ may be replaced with $T_{target} - T_{ref}$.

Optionally, in Embodiment 1 of the present invention, depending on the value of one or more of $N_{hyperdirectframe}^\mu$, $N_{directframe}^{hyperdirectframe,\mu}$, $N_{directframe}^\mu$, $N_{directhalfframe}^{directframe,\mu}$, $N_{directsubframe}^{directframe,\mu}$, $N_{directsubframe}^{directhalfframe,\mu}$, $N_{directslot}^{directframe,\mu}$, $N_{directslot}^{directhalfframe,\mu}$, $N_{directslot}^{directsubframe,\mu}$, $N_{directframe}^\mu$, $T_{directhalfframe}^\mu$, $T_{directsubframe}^\mu$, and $T_{directslot}^\mu$, the formula for calculating one or more of $n_{hdfn}$, $n_{dfn}$, $n_{dhfn}$, $n_{directsubframe}$, and $n_{directslot}$ may be simplified or rewritten accordingly. For example, if $T_{directsubframe}^\mu = 1$ millisecond, then $1/T_{directslot}^\mu$ is equal to the number of direct slots in one direct subframe (i.e., $N_{directslot}^{directsubframe,\mu}$); therefore, $(T_{target} - T_{ref} - \Delta_T)/T_{directslot}^\mu$ may be replaced with $N_{directslot}^{directsubframe,\mu} \cdot (T_{target} - T_{ref} - \Delta_T)$.

Optionally, in Embodiment 1 of the present invention, the hyper direct frame may be referred to as a different name, for example, a hyper system frame, a hyper radio frame, or a hyper sidelink (SL) frame, or the like.

Optionally, in Embodiment 1 of the present invention, the hyper direct frame number may be referred to as a different name, for example, a hyper system frame number, a hyper radio frame number, or a hyper sidelink frame number, or the like.

Optionally, in Embodiment 1 of the present invention, the direct frame may be referred to as a different name, for example, a system frame, a radio frame, a sidelink frame, or the like.

Optionally, in Embodiment 1 of the present invention, the direct frame number may be referred to as a different name, for example, a system frame number, a radio frame number, or a sidelink frame number, or the like.

Optionally, in Embodiment 1 of the present invention, the direct half frame may be referred to as a different name, for example, a half direct frame, or a half system frame, or a half radio frame, or a half frame, or a system half frame, or a radio half frame, or a sidelink half frame, or the like.

Optionally, in Embodiment 1 of the present invention, the direct half frame number may be referred to as a different name, for example, a half direct frame number, or a half system frame number, or a half radio frame number, or a half frame number, or a system half frame number, or a radio half frame number, or a sidelink half frame number, or the like.

Optionally, in Embodiment 1 of the present invention, the direct subframe may be referred to as a different name, for example, a subframe, or a system subframe, or a radio subframe, or a sidelink subframe, or the like.

Optionally, in Embodiment 1 of the present invention, the direct subframe number may be referred to as a different name, for example, a subframe number, or a system subframe number, or a radio subframe number, or a sidelink subframe number, or the like.

Optionally, in Embodiment 1 of the present invention, the direct slot may be referred to as a different name, for example, a slot, a system slot, or a radio slot, or a sidelink slot, or the like.

Optionally, in Embodiment 1 of the present invention, the direct slot number may be referred to as a different name, for example, a slot number, or a system slot number, or a radio slot number, or a sidelink slot number, or the like.

Optionally, in Embodiment 1 of the present invention, the UE may be replaced with a base station (for example, an eNB, or a gNB, or other types of base stations), or any other entity capable of operating on a sidelink.

Optionally, in Embodiment 1 of the present invention, when the UE selects a GNSS as the synchronization reference source, step S101 is performed.

Optionally, in Embodiment 1 of the present invention, when the UE selects the GNSS as the synchronization reference source, step S103 is performed.

Optionally, in Embodiment 1 of the present invention, when the UE selects the GNSS as the synchronization reference source, step S101 and step S103 are performed.

In this way, Embodiment 1 of the present invention derives a timing-related parameter of a sidelink such as a hyper direct frame number, a direct frame number, a direct half frame number, a direct subframe number, and a direct slot number by using a current UTC time, so that all user equipment (UE) and base stations and/or other entities operating on the sidelink can be synchronized in the timing parameter, ensuring correct transmission and reception of the user equipment (UE) and base stations and/or other entities on the sidelink.

VARIATION EMBODIMENT

Figure 3:
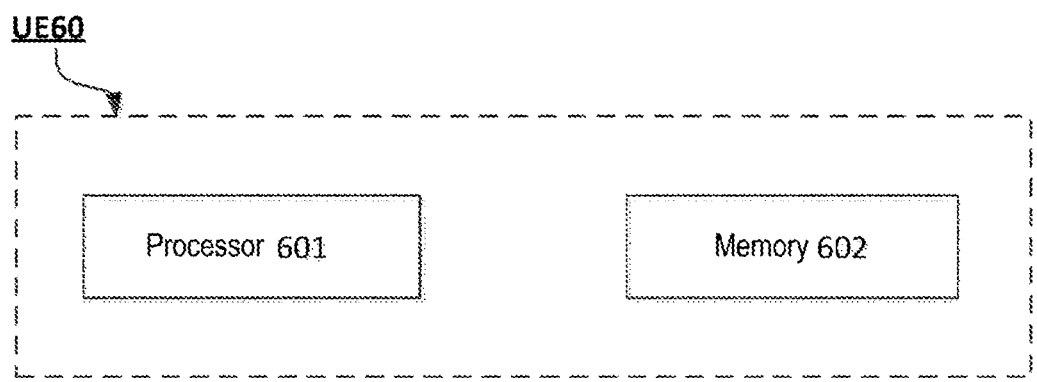
FIG. 3 is a block diagram schematically showing user equipment according to the present invention.

Hereinafter, FIG. 3 is used to illustrate user equipment that can perform the method performed by user equipment described in detail above in the present invention as a variant embodiment.

FIG. 3 is a block diagram showing the user equipment (UE) involved in the present invention.

As shown in FIG. 3, the user equipment 60 includes a processor 601 and a memory 602. The processor 601 may, for example, include a microprocessor, a microcontroller, an embedded processor, or the like. The memory 602 may include, for example, a volatile memory (for example, a random access memory (RAM)), a hard disk drive (HDD), a non-volatile memory (for example, a flash memory), or other memories. Program instructions are stored on the memory 602. The instructions, when run by the processor 601, can perform the foregoing method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the term "base station" may refer to a mobile communication data and control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment (UE) comprising:
selection circuitry configured to select a Global Navigation Satellite System (GNSS) as a synchronization reference source;
calculation circuitry configured to derive a slot number $n_{slot}$ within a frame; and
communication circuitry configured to perform New Radio (NR) sidelink communication with use of the slot number $n_{slot}$, wherein the slot number $n_{slot}$ is derived according to a formula expressed as:

$$n_{slot} = \lfloor (T_{current} - T_{ref} - \Delta_T) \cdot 2^\mu \rfloor \bmod (10 \cdot 2^\mu), \text{ wherein}$$

a parameter $T_{current}$ is a current Coordinated Universal Time (UTC) time obtained from the GNSS,
the parameter $T_{current}$ is expressed in milliseconds,
a parameter $T_{ref}$ is a reference UTC time 00:00:00 on Gregorian calendar date 1 January 1900,
the parameter $T_{ref}$ is expressed in milliseconds,
a parameter $\Delta_T$ is determined such that the parameter $\Delta_T$ is equal to 0 if a timing offset parameter is not configured and the parameter $\Delta_T$ is equal to a product of the timing offset parameter and 0.001 if the timing offset parameter is configured,
the parameter $\Delta_T$ is expressed in milliseconds,
a parameter $\mu$ is a Subcarrier Spacing (SCS) configuration for the NR sidelink communication, and
the parameter $\mu$ is equal to one of values 0, 1, 2, and 3 that correspond to 15 kHz SCS, 30 kHz SCS, 60 kHz SCS, and 120 kHz SCS, respectively.

* * * * *